(12) United States Patent
Brooks et al.

(10) Patent No.: US 8,671,129 B2
(45) Date of Patent: Mar. 11, 2014

(54) SYSTEM AND METHOD OF BYPASSING UNROUNDED RESULTS IN A MULTIPLY-ADD PIPELINE UNIT

(75) Inventors: Jeffrey S. Brooks, Austin, TX (US); Christopher H. Olson, Austin, TX (US)

(73) Assignee: Oracle International Corporation, Redwood City, CA (US)

(*) Notice: Subject to any disclaimer, the term of this patent is extended or adjusted under 35 U.S.C. 154(b) by 536 days.

(21) Appl. No.: 13/043,101

(22) Filed: Mar. 8, 2011

(65) Prior Publication Data

US 2012/0233234 A1 Sep. 13, 2012

(51) Int. Cl.
*G06F 7/32* (2006.01)

(52) U.S. Cl.
USPC ............ 708/521; 708/490; 708/497; 708/503

(58) Field of Classification Search
None
See application file for complete search history.

(56) References Cited

U.S. PATENT DOCUMENTS

| | | | | |
|---|---|---|---|---|
| 4,841,468 | A | * | 6/1989 | Miller et al. .................. 708/625 |
| 5,694,350 | A | * | 12/1997 | Wolrich et al. ............... 708/497 |
| 5,957,997 | A | | 9/1999 | Olson et al. |
| 6,275,838 | B1 | | 8/2001 | Blomgren et al. |
| 6,460,134 | B1 | | 10/2002 | Blomgren et al. |
| 6,542,916 | B1 | | 4/2003 | Hinds et al. |
| 6,557,021 | B1 | | 4/2003 | Brooks et al. |
| 6,889,241 | B2 | | 5/2005 | Pangal et al. |
| 7,080,111 | B2 | | 7/2006 | Pangal et al. |
| 7,099,910 | B2 | | 8/2006 | Brooks et al. |
| 7,392,273 | B2 | | 6/2008 | Gerwig et al. |
| 7,730,117 | B2 | | 6/2010 | Fleischer et al. |
| 7,912,887 | B2 | | 3/2011 | Dockser et al. |
| 8,046,399 | B1 | | 10/2011 | Inaganti et al. |
| 2005/0144216 | A1 | * | 6/2005 | Simkins et al. ............... 708/620 |
| 2005/0228844 | A1 | | 10/2005 | Dhong et al. |
| 2009/0287757 | A1 | | 11/2009 | Rarick |

OTHER PUBLICATIONS

Schmookler, et al.; "Leading Zero Anticipation and Detection—A Comparison of Methods"; Proceedings of the 15th IEEE Symposium on Computer Arithmetic; 2001, pp. 7-12.
Eric Charles Quinnell, "Floating-Point Fused Multiply-Add Architectures," Chapter 2, PhD Dissertation at University of Texas atAustin, May 2007.
T. Lang and J. D. Bruguera, "Floating-Point Fused Multiply-Add with Reduced Latency," Proceedings of the 2002 IEEE International Conference on Computer Design: VLSI in Computers and Processors, pp. 145-150,2002.

(Continued)

*Primary Examiner* — Michael D Yaary
(74) *Attorney, Agent, or Firm* — Rory D. Rankin; Meyertons, Hood, Kivlin, Kowert & Goetzel, P.C.

(57) ABSTRACT

A processing unit, system, and method for performing a multiply operation in a multiply-add pipeline. To reduce the pipeline latency, the unrounded result of a multiply-add operation is bypassed to the inputs of the multiply-add pipeline for use in a subsequent operation. If it is determined that rounding is required for the prior operation, then the rounding will occur during the subsequent operation. During the subsequent operation, a Booth encoder not utilized by the multiply operation will output a rounding correction factor as a selection input to a Booth multiplexer not utilized by the multiply operation. When the Booth multiplexer receives the rounding correction factor, the Booth multiplexer will output a rounding correction value to a carry save adder (CSA) tree, and the CSA tree will generate the correct sum from the rounding correction value and the other partial products.

20 Claims, 10 Drawing Sheets

(56) References Cited

OTHER PUBLICATIONS

E. Hokenek, R. Montoye and P.W. Cook, "Second-Generation RISC Floating Point with Multiply-Add Fused," IEEE Journal of Solid-State Circuits, vol. 25, pp. 1207-1213, 1990.

A. Naini, A. Dhablania, W. James and D. Das Sarma, "1 GHz HAL Sparc64 Dual Floating Point Unit with RAS Features," Proceedings of the 15th Symposium on Computer Arithmetic, pp. 173-183, 2001.

\* cited by examiner

| Booth Encoder Truth Table 600 |||||||||||
|---|---|---|---|---|---|---|---|---|---|
| Inputs ||||| Outputs |||||
| Bit 2 | Bit 1 | Bit 0 | XOR Mode | Rounding Correction | +3 | -2 | -1 | +1 | +2 |
| 0 | 0 | 0 | 0 | 0 | 0 | 0 | 0 | 0 | 0 |
| 0 | 0 | 1 | 0 | 0 | 0 | 0 | 0 | 1 | 0 |
| 0 | 1 | 0 | 0 | 0 | 0 | 0 | 0 | 1 | 0 |
| 0 | 1 | X | 1 | 0 | 0 | 0 | 0 | 1 | 0 |
| 0 | 1 | 1 | 0 | 0 | 0 | 0 | 0 | 0 | 1 |
| 1 | 0 | X | 1 | 0 | 0 | 0 | 0 | 0 | 1 |
| 1 | 0 | 0 | 0 | 0 | 0 | 1 | 0 | 0 | 0 |
| 1 | 0 | 1 | 0 | 0 | 0 | 0 | 1 | 0 | 0 |
| 1 | 1 | 0 | 0 | 0 | 0 | 0 | 1 | 0 | 0 |
| 1 | 1 | X | 1 | 0 | 1 | 0 | 0 | 0 | 0 |
| 1 | 1 | 1 | 0 | 0 | 0 | 0 | 0 | 0 | 0 |
| X | X | X | X | 1 | 1 | 0 | 0 | 0 | 0 |

*FIG. 6*

SYSTEM AND METHOD OF BYPASSING UNROUNDED RESULTS IN A MULTIPLY-ADD PIPELINE UNIT

BACKGROUND OF THE INVENTION

1. Field of the Invention

This disclosure relates generally to computer processors, and in particular to a system and method for executing a multiply-add operation in a multiply-add pipeline utilizing an unrounded result from a prior operation.

2. Description of the Related Art

Processors may include one or more specialized multiply and add execution pipelines to perform multiply and add instructions. A common metric used to measure the performance of a multiply-add pipeline is the latency required to complete the execution of a multiply-add instruction. As many instructions may be executed in succession, with the result of one operation fed back as an input of the next operation, the latency of the pipeline may have a major impact on the time required to complete a large sequence of operations.

One way to increase the performance of the multiply-add pipeline is by reducing the latency of the pipeline. One technique which may be used to reduce the latency is to bypass the unrounded result of an operation to the input operands for use in the next instruction. A typical multiply-add pipeline executes an instruction, and then after the preliminary, unrounded result has been calculated, the pipeline may determine if rounding is required, and if so, perform the rounding. Then, the rounded result may be routed back to the input operands of the pipeline. The rounding stage of the multiply-add pipeline may add one or more extra stages of delay to the pipeline.

Therefore, what is needed is a way to bypass the unrounded, intermediate result to the input operands of the pipeline and compensate for the lack of rounding if during a subsequent operation it is determined that rounding is required on the intermediate result. In addition, it would be preferable to utilize the existing resources and architecture of the multiply-add pipeline as much as possible while implementing the rounding compensation technique.

In view of the above, improved methods and apparatus for executing a multiply-add operation on a bypassed, unrounded result in a multiply-add pipeline are desired.

SUMMARY OF THE INVENTION

Various embodiments of methods and apparatus for performing a multiply-add operation in a multiply-add pipeline are contemplated. In one embodiment, an unrounded result is bypassed to the inputs of the pipeline to be used in a subsequent operation. The width of the input value may be less than the maximum supported width of the multiply-add pipeline. The input values may be left-justified within the multiplier architecture, such that any unused components are aligned on the right side of the multiplier.

The multiplier may include a series of two or more encoders and a series of two or more multiplexers. In one embodiment, the encoders may be Booth encoders. Each encoder in the series of encoders may be aligned with a multiplexer of the series of multiplexers. The encoders may map input bit values to factors, and the factors may be coupled to the select inputs of the multiplexers.

One or more of the encoders in the series of encoders may not be utilized by the multiply operation based on the width of the input value. A first unused encoder may be configured to receive a rounding correction signal as an input. The first unused encoder may be the most significant unused encoder of the one or more unused encoders. The rounding correction signal may be asserted if an input value needs to be rounded based on a prior operation. The input value may have been bypassed early as an unrounded, intermediate result from a prior operation to one or more of the input operands of the pipeline. If it is determined that rounding is required on the unrounded, intermediate result, the rounding correction signal may be asserted. In response to the rounding correction signal being asserted, the first unused encoder may be configured to output a rounding correction factor to the first unused multiplexer.

One or more of the multiplexers in the series of multiplexers may not be utilized by the multiply operation. A first unused multiplexer may be configured to receive a select input from the first unused encoder. The first unused multiplexer may also be configured to receive one or more rounding correction values as data inputs. The first unused multiplexer may be the most significant unused multiplexer in the one or more unused multiplexers. In response to receiving the rounding correction factor, the first unused multiplexer may be configured to output a rounding correction value.

In another embodiment, the pipeline may include a second multiplexer. The second multiplexer may not be included in the series of multiplexers. The second multiplexer may be configured to receive two or more rounding correction values as inputs and to output a selected rounding correction value to the first unused multiplexer of the series of multiplexers.

The rounding correction value may be coupled from the output of the first unused multiplexer to one of the inputs of a carry save adder (CSA) tree. The CSA tree may include one or more levels of CSA's and carry propagate adders (CPA's). The CSA tree may be configured to receive inputs from the series of multiplexers. The inputs may include the rounding correction value and a plurality of partial products generated by the series of multiplexers. The CSA tree may be configured to generate a sum of the inputs.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 6 illustrates one embodiment of a Booth encoder truth table.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
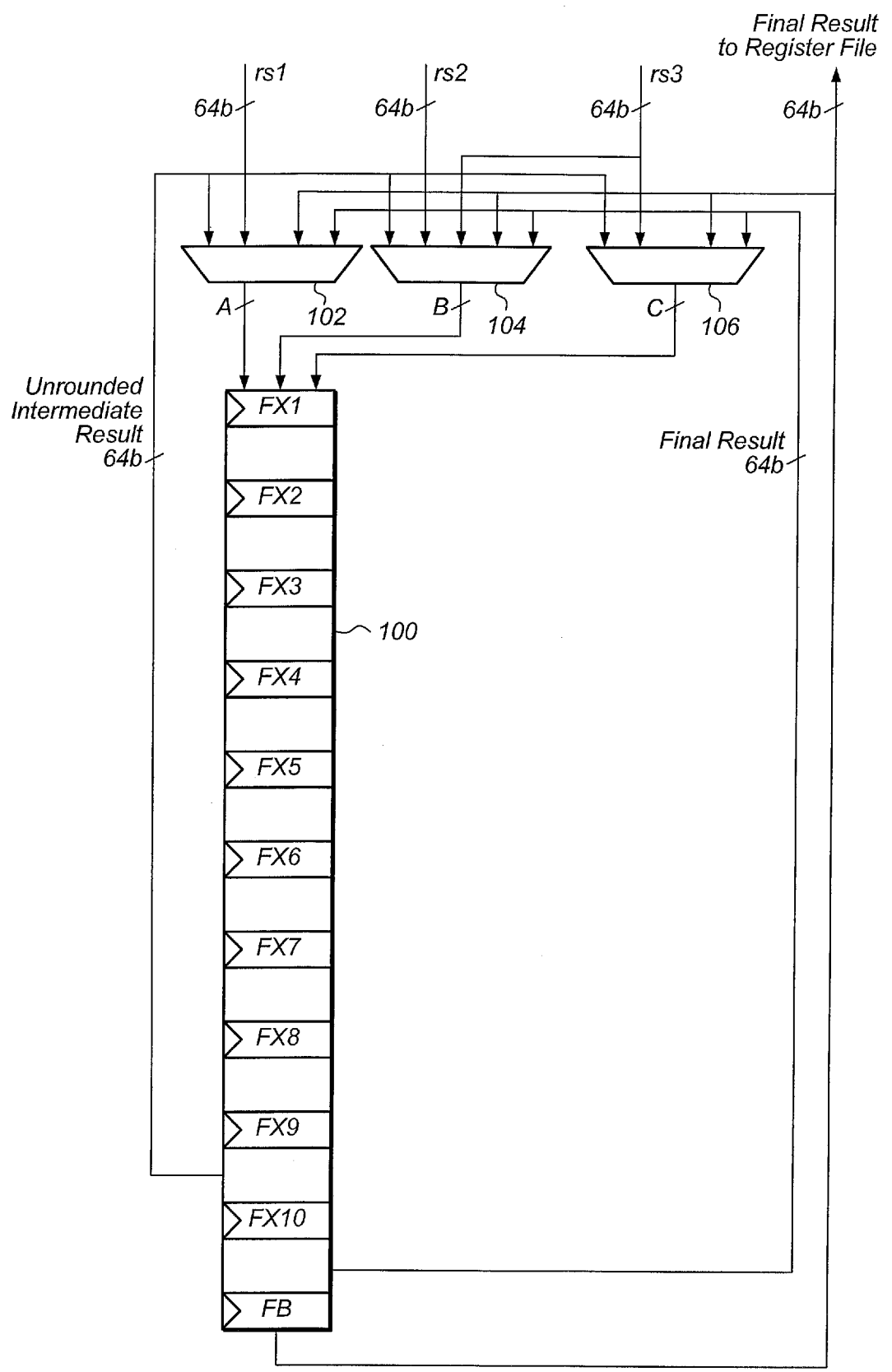
FIG. 1 illustrates one embodiment of a multiply-add pipeline with an unrounded intermediate result routed back to the inputs of the pipeline.

Referring to FIG. 1, a block diagram of one embodiment of a multiply-add pipeline with an unrounded intermediate result routed back to the inputs of the pipeline is shown. Multiply-add pipeline 100 may also be referred to as a multiply-accumulate pipeline, multiply-add pipeline unit, multiply-add execution unit, multiply-add module, or other such terms. Multiply-add pipeline 100 may be optimized for the operation (A*C+B=result). Other instructions may be implemented using multiply-add pipeline 100 and setting one or more of the inputs to a constant. For example, an add instruction (A+B=result) may be executed by pipeline 100 by setting C equal to one. Also, a multiply instruction (A*C=result) may be executed by pipeline 100 by setting B to zero. In some embodiments, multiply-add pipeline 100 may be fully pipelined such that it may be capable of starting one new instruction per execution cycle.

In one embodiment, a processor may include a floating point unit, a storage unit, input/output logic, and other arithmetic units. The processor may also include a plurality of processing cores, and each core may be configured to execute multiple threads concurrently. The floating point unit may include one or more multiply-add pipelines, such as multiply-add pipeline 100, and one or more threads of one or more cores may utilize the pipelines to execute multiply-add instructions. In some embodiments, each core may include a floating point unit with one or more multiply-add pipelines. Each floating point unit may be configured to execute a multiply-add instruction utilizing a multiply-add pipeline as defined by an instruction set architecture (ISA).

As shown in FIG. 1, the unrounded intermediate result may be bypassed from stage 9 (FX9) to input operand multiplexers 102, 104, and 106. The unrounded intermediate result may be fed back to multiplexers 102, 104, and 106 and selected by any or all of the multiplexers and used during a dependent instruction. The final result may be routed back to multiplexers 102-106 after stage 10 (FX10). Also, the final result may be written to the register file after stage 11 (FB), or bypass stage, and this final result may also be routed back to multiplexers 102-106. Register file outputs rs1, rs2, and rs3 may also be coupled to multiplexers 102-106.

Figure 2:
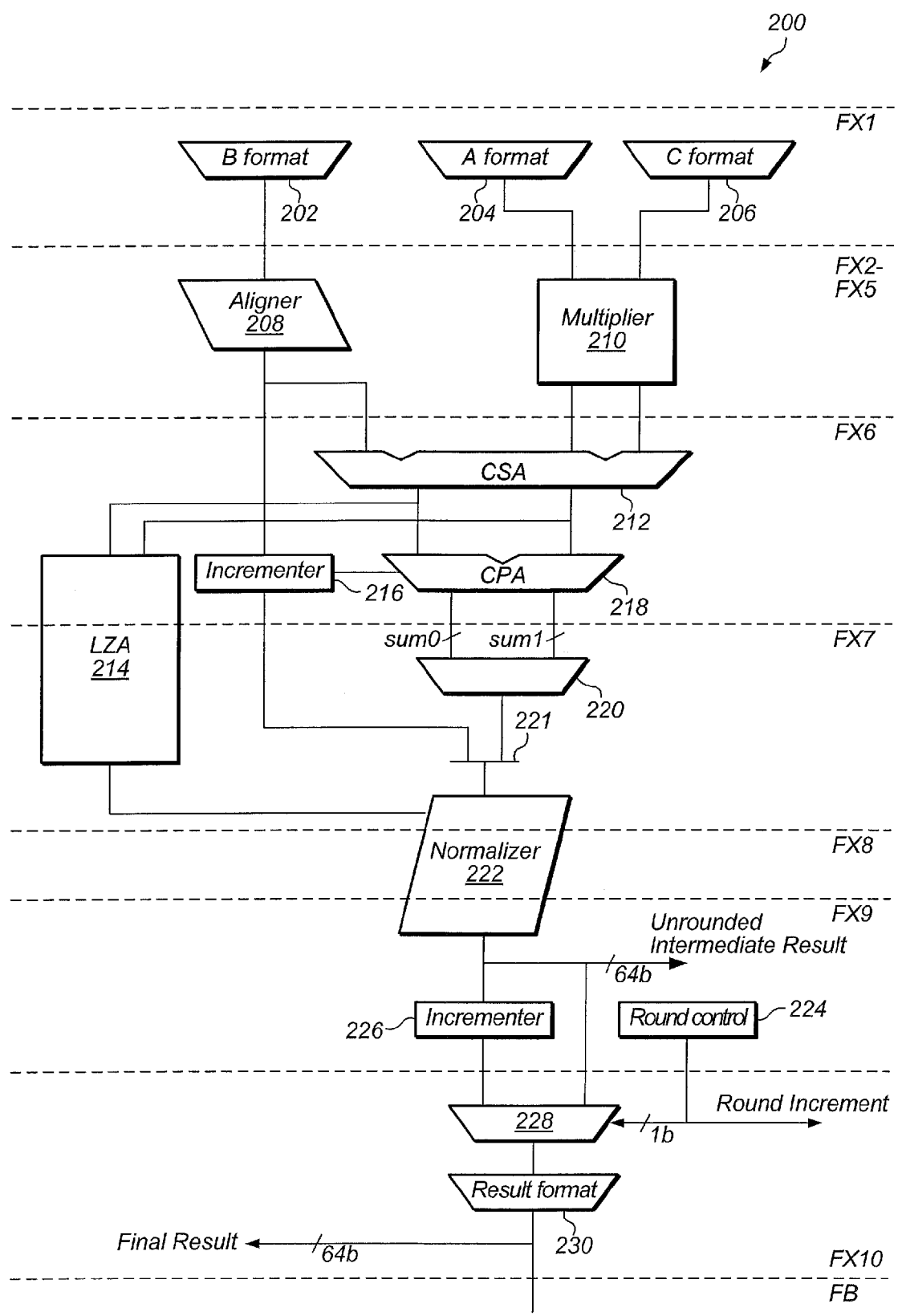
FIG. 2 is a block diagram that illustrates the components of a multiply-add pipeline in accordance with one or more embodiments.

Referring now to FIG. 2, a block diagram of one embodiment of a multiply-add pipeline is shown. In one embodiment, pipeline 200 may be a 64-bit by 64-bit multiplier, and a multiply and addition operation of two double-precision floating point numbers may be performed by pipeline 200. The mantissa of a double-precision floating point number is 53 bits (52 bits plus a leading '1'). Therefore, pipeline 200 may contain unused elements when performing a multiply operation of two double-precision floating point numbers, with the unused elements corresponding to the unused 11 bits of the 64-bit by 64-bit multiplier. In other embodiments, pipeline 200 may support a maximum data width other than 64 bits. For example, pipeline 200 may support a 128-bit by 128-bit multiply. Also, the actual values being multiplied may be a variety of bit-width sizes, with double-precision floating point numbers being only one possible bit-width size.

Pipeline 200 may perform the multiply add operation A*C+B, wherein A, B, and C are double-precision floating point numbers. Pipeline 200 may be a fused multiply-add pipeline. A fused multiply-add pipeline may be defined as a pipeline performing a multiply operation (A*C=product) followed by an addition operation (product+B=intermediate result) followed by a rounding operation (rounded result). In another embodiment, pipeline 200 may be an unfused multiply-add pipeline. An unfused multiply add-pipeline may be defined as a pipeline performing a multiply operation (A*C=unrounded product) followed by a rounding operation (rounded product) followed by an addition operation (rounded product+B=intermediate result) followed by a single rounding operation (rounded result). In an unfused multiply-add pipeline, the unrounded intermediate result may be bypassed to the inputs of the pipeline to be used in the next instruction.

Referring again to FIG. 2, the inputs to pipeline 200 may be provided to B input operand multiplexer 202, A input operand multiplexer 204, and C input operand multiplexer 206. The output of B input operand multiplexer 202 may be coupled to aligner 208. Aligner 208 may align the mantissa of the B input value so that it lines up with the mantissas of the A and C input values. The output of aligner 208 may be coupled to the input of carry save adder (CSA) 212. The output of aligner 208 may also be coupled to the input of incrementer 216.

In one embodiment, the outputs of A input operand multiplexer 204 and C input operand multiplexer 206 may be 53-bit-width operands that are coupled to the inputs of multiplier 210. Multiplier 210 may perform a 53-bit by 53-bit multiply on the input operands. In one embodiment, multiplier 210 may be a 64-bit by 64-bit multiplier. The unused elements of multiplier 210 may be used to perform a rounding correction on unrounded inputs.

Multiply-add pipeline 200 may include a summing circuit for summing a plurality of partial products. In one embodiment, the summing circuit may be a CSA tree. In various embodiments, the partial products may be Booth encoded. Booth encoding is a method of reducing the number of partial products so that multiplication may be performed more rapidly. As depicted in FIG. 2, the summing circuit may include CSA 212 and carry propagate adder (CPA) 218.

CSA 212 may receive three inputs and perform an addition operation with two outputs: a sequence of partial sum bits and a sequence of carry bits. Both sequences of partial sum bits and carry bits may be the same length as the input operands. Multiplier 210 represents a tree of a plurality of CSA's in a plurality of levels which will be described in further detail below. In other embodiments, multiplier 210 may be implemented as a multiply tree (e.g., Wallace tree, Dadda tree) using any combination and type of adders and/or logic gates, including half adders, full adders, CSA's, carry look-ahead adders, carry propagate adders (CPA's), XOR gates, AND gates, and/or other types of adders and logic gates.

The outputs from CSA 212 may be coupled to the inputs of CPA 218 and leading zero anticipator (LZA) 214. As used herein, a CPA refers to an adder that performs addition of two operands and a carry in signal by performing carry propagation from each bit to higher bit positions. LZA 214 may be configured to determine the number of leading zeros or ones within the sum of the outputs from CSA 212. The output of LZA 214 may be coupled to normalizer 222.

CPA 218 may add the input terms received from CSA 212, and the output of CPA 218 may be the sum terms, sum0 and sum1. Sum0 and sum1 may be coupled to the inputs of multiplexer 220. The output from multiplexer 220 and the output from incrementer 216 may be combined by concatenation 221 and then coupled to normalizer 222. Normalizer 222 may provide an output to incrementer 226, and normalizer 222 may provide an output to multiplexer 228 in parallel with an output from incrementer 226. The output from normalizer 222 may be the unrounded intermediate result with a bit-width of 64 bits. The unrounded intermediate result may be available in the ninth stage of multiply-add pipeline module 200. The unrounded intermediate result may be coupled back to input multiplexers 202-206.

Round control module 224 may determine if rounding is required during the ninth stage of pipeline module 200. The output of round control module 224 may be used as the 1-bit select input to multiplexer 228. Incrementer 226 may increment the output from normalizer 222, and multiplexer 226 may select from the output of incrementer 226 or the output from normalizer 222 based on the round control bit. The round increment control bit may also be routed to multiplier 210 as a rounding correction signal for use in the next instruction. The rounding correction signal may be asserted when the unrounded result is used as an input to the next operation and it is determined that rounding is needed on the result of the prior operation.

Result format block 230 may properly format the output of multiplexer 228 and process any special cases, such as infinity, underflow, overflow, or other exceptions. The output of result format block 230 may be the final result which may also be routed back to input multiplexers 202-206. The final result may be available in the tenth stage of multiply-add pipeline module 200.

Figure 3:
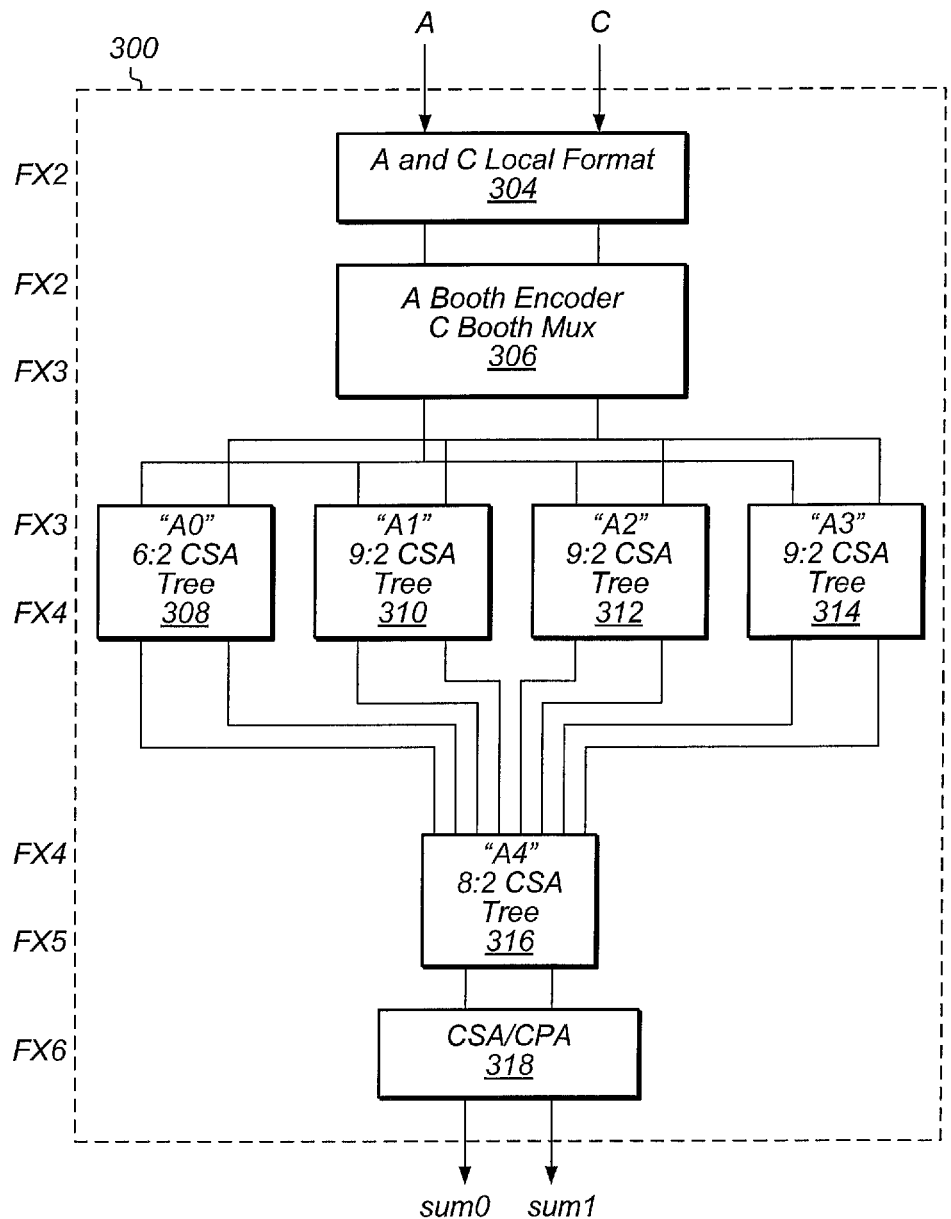
FIG. 3 illustrates a block diagram of one embodiment of a multiplier.

Referring now to FIG. 3, a block diagram of one embodiment of a multiplier is shown. Multiplier 300 may be a radix-4 Booth multiplier. Multiplier 300 displays the first six stages of a multiply-add pipeline for the A and C input values, in which the operation being performed is (A*C+B). Block 304 may include the input operand multiplexers of multiplier 300. Block 306 may include the Booth encoders and multiplexers of multiplier 300. The multiplexers of block 306 may be referred to as Booth multiplexers. In one embodiment, there may be a series of 33 Booth encoders and a series of 33 Booth multiplexers that make up part of a 64-bit by 64-bit multiplier. In other embodiments, there may be other quantities of Booth encoders and Booth multiplexers utilized within multipliers of a variety of sizes. Each Booth encoder may be coupled to three contiguous input bits of the "A" input value. Consecutive Booth encoders may overlap on one of the inputs bits, such that a first Booth encoder may be coupled to bits A0, A1, and A2, a second Booth encoder may be coupled to bits A2, A3, and A4, and so on.

There may be a one-to-one correspondence of Booth encoders to Booth multiplexers. The outputs from the Booth encoders may be connected to the select inputs of the Booth multiplexers. The data inputs to the Booth multiplexers may be the "C" input value and shifted versions of the C input value. In one embodiment, the Booth multiplexers may be AND-OR multiplexers, such that if the select inputs are zero, then the outputs of the Booth multiplexers are also zero.

CSA tree 308 (or A0) may be a 6:2 CSA tree for adding the partial product terms from six Booth multiplexers. CSA tree 308 may connect to the six Booth multiplexers corresponding to the six most significant partial products. CSA trees 310, 312, and 314 (or A1, A2, and A3) are 9:2 CSA trees, each of which may add the partial product terms from nine Booth multiplexers. The outputs from CSA trees 308-314 may be coupled to the inputs of CSA tree 316 (or A4). CSA tree 316 may be an 8:2 CSA tree for adding the inputs from the CSA trees of the adjacent level. The outputs from CSA tree 316 may be coupled to the inputs of CSA/CPA 318. CSA/CPA 318 may include a CSA and a CPA, and the outputs from CSA/CPA 318 may be the sum0 and sum1 outputs. In other embodiments, multiplier 300 may be implemented with different types of multipliers and configured into different types of tree structures. For example, multiplier 300 may be implemented with encoders and multiplexers that do not utilize Booth encoding.

Figure 4:
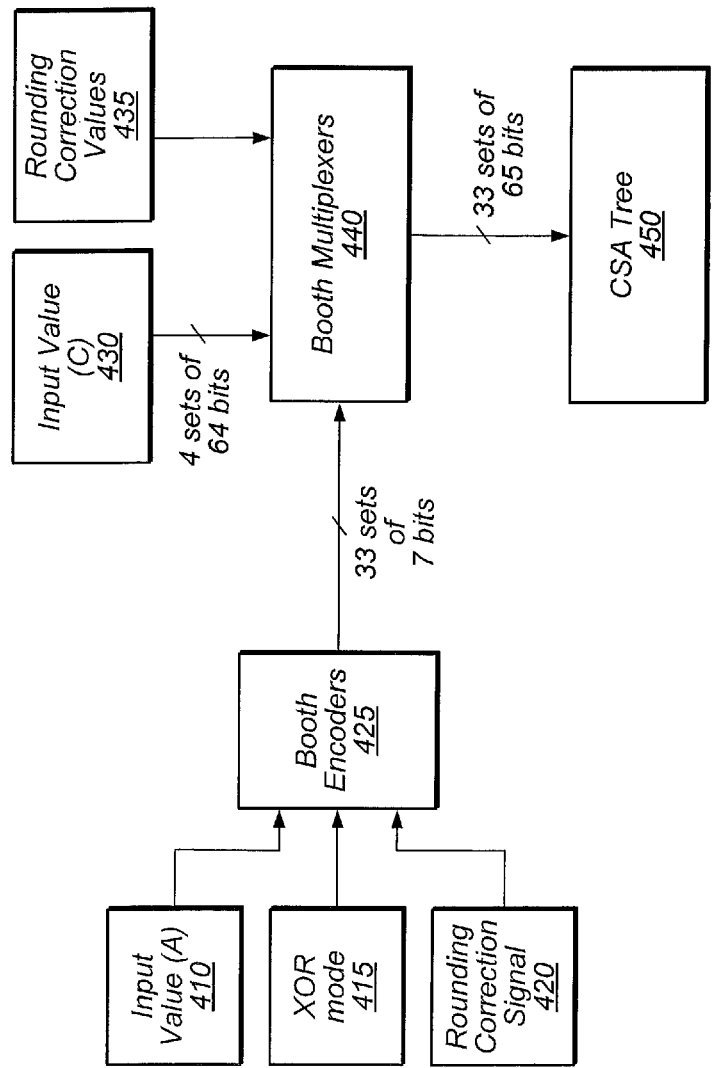
FIG. 4 illustrates a block diagram of one embodiment of a multiplier utilizing Booth encoders and multiplexers.

Referring now to FIG. 4, a block diagram of a multiplier utilizing Booth encoders and Booth multiplexers is shown. Input value 410, corresponding to the value A, may be coupled to Booth encoders 425. In some embodiments, Booth encoders 425 may be other types of encoders not utilizing Booth encoding. The multiply operation being executed may be (A*C=product). Input value 410 may be a double-precision floating point number with a mantissa of 53 bits. In other embodiments, input value 410 may be other types of numbers (e.g., integer, single-precision floating point number).

In a traditional Booth multiplier, only the bits of the input value may be coupled to the inputs of the Booth encoders. As shown in FIG. 4, a variation on the traditional Booth encoding scheme is depicted, wherein XOR mode 415 and rounding correction signal 420 may also be coupled to Booth encoders 425. The architecture of some multipliers may include an XOR mode, allowing the multiplier to perform an XOR multiply as well as a regular integer multiply. Rounding correction signal 420 may indicate to a specific Booth encoder of Booth encoders 425 that rounding is required for the value being multiplied. In one embodiment, the specific Booth encoder may be the first unused Booth encoder in the series of Booth encoders 425.

If a previous instruction bypassed an unrounded intermediate result to the input of the current instruction, and it is determined that rounding is required for the previous instruction, then rounding correction signal 420 may be a logic high signal. Rounding correction signal 420 may be set by a round control module (not shown), such as round control module 224 of FIG. 2. The round control module may look at the sticky and guard bits, the least significant bit (LSB) and the rounding mode to determine if rounding is required. If rounding correction signal 420 is asserted (i.e., logic high), then the first unused Booth encoder may output a rounding correction factor to its corresponding Booth multiplexer. In one embodiment, the rounding correction factor may be a "+3" factor. In various embodiments, rounding correction signal 420 may be an active low signal, such that a logic low signal would indicate that rounding is required.

Booth encoders 425 may be a series of 33 Booth encoders. In other embodiments, other quantities of Booth encoders may be included in the series of Booth encoders. Each encoder may be configured to map the bits coupled from input value 410, which are originally represented in binary values of 0 and 1, into a set of multiplication factors which may take on the values of −2, −1, 0, 1, or 2. The utilization of XOR mode 415 also allows the output of each encoder to take on the additional value of +3. When the rounding correction signal 420 is asserted, the specific encoder to which it is coupled may output the +3 value or another rounding correction factor. The output from each encoder is a 7-bit value. The 7-bits include the 5-bits to represent the multiplication factor and an extra P and H bit to represent the sign extension bits.

There are several methods of dealing with the sign bits of the partial products in multipliers that utilize Booth encoding that are known to those skilled in the art. One of these methods involves the use of an extra P and H bit to represent the sign extension bits. The partial products generated by Booth multiplexers 440 may be signed partial products, and the sign bits may need to be extended to the left as the signed partial products are added together by CSA tree 450. Outputting the P and H bits from Booth encoders 425 to Booth multiplexers 440 may eliminate the need to sign extend the partial products in CSA tree 450. In total, 33 sets of 7-bits may be coupled to Booth multiplexers 440.

Input value 430, corresponding to the value C, may be coupled to Booth multiplexers 440. In one embodiment, input value 430 may be a double-precision floating point number with a mantissa of 53 bits. In other embodiments, input value 430 may be other types of numbers (e.g., integer, single-precision floating point number). In some embodiments, Booth multiplexers 440 may be other types of multiplexers not implementing a Booth multiplication algorithm.

Rounding correction values 435 may be coupled to Booth multiplexers 440. Rounding correction values 435 may include a plurality of possible values which may need to be added to CSA tree 450 to correct for the lack of rounding in a previous instruction. For example, if a multiply-add pipeline is implementing the operation A*C+B, and A is the rounded result from a previous operation, but the unrounded result A' is bypassed early, then the resultant operation will be A'*C+B. To correct for the unrounded result being used in the multiply operation, a C term may be added to CSA tree 450 to correct for rounding not being performed. The corrected result will be A'*C+C+B, which is equivalent to (A'+1)*C+B, and since (A'+1)=A, then (A'+1)*C+B=A*C+B. Similarly, the value of A may be added to CSA tree 450 if the unrounded result is coupled to Input Value (C) 430, and the value of (2*A'+1) may be added to CSA tree 450 if the unrounded result is coupled to Input Value (A) 410 and Input Value (C) 430.

Booth multiplexers 440 may be a series of 33 separate Booth multiplexers. In other embodiments, other quantities of Booth multiplexers may be included in Booth multiplexers 440. Booth multiplexers 440 may be configured to select from a plurality of data input values based on the values of one or more select inputs. Input value (C) 430 may be coupled to the inputs of each Booth multiplexer. Input value (C) 430 may be shifted and/or inverted to produce different factors of input values corresponding to C multiplied by 2, −1, and −2. The output from each Booth multiplexer may be a 65-bit value. In total, 33 sets of 65-bits may be coupled to CSA tree 450.

CSA tree 450 may add up the outputs received from Booth multiplexers 440. The outputs received may be referred to as partial products, and CSA tree may generate a sum from the plurality of partial products. CSA tree 450 may include one or more levels of CSA's and CPA's.

Figure 5:
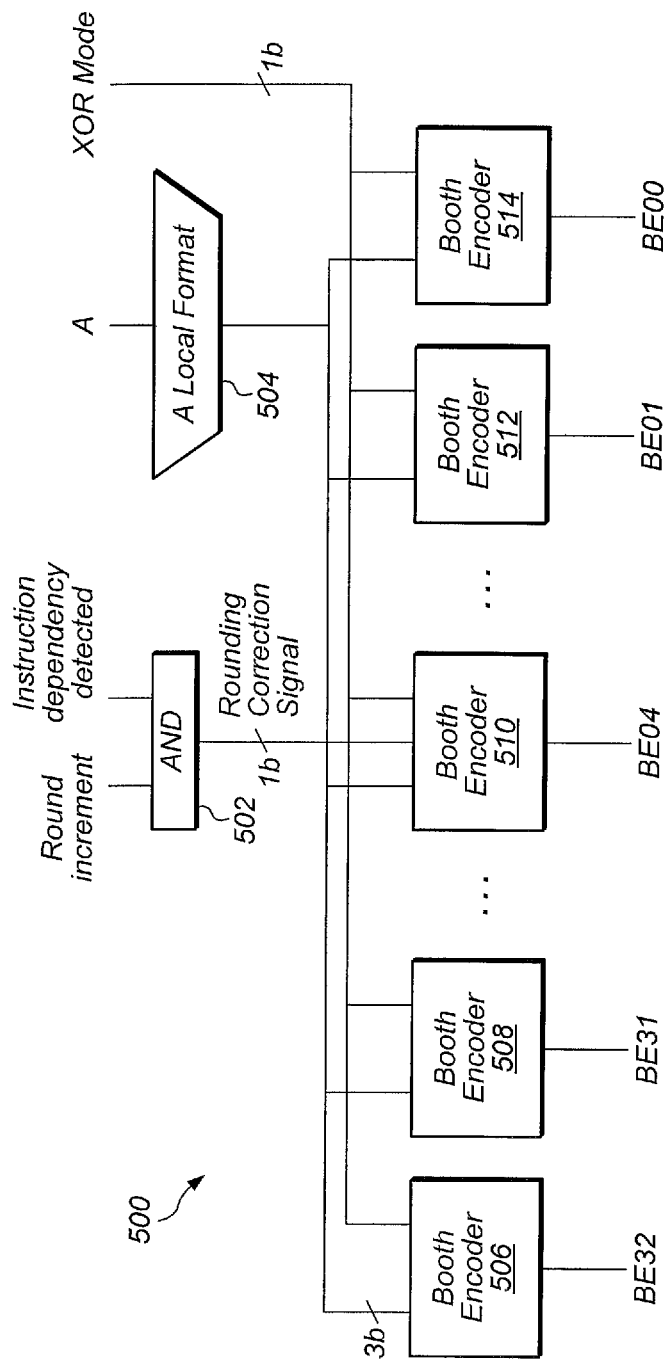
FIG. 5 illustrates a block diagram of one embodiment of a series of Booth encoders.

Turning now to FIG. 5, a block diagram of one embodiment of a series of Booth encoders is shown. Series 500 may include 33 Booth encoders, though only five of these Booth encoders are shown in FIG. 5. Input value A may be coupled to input operand multiplexer 504. In one embodiment, input value A may be the mantissa of a double-precision floating point number. In other embodiments, input value A may be other types of numbers with other number of bits (e.g., single-precision floating point number, integer).

Since the bit-width of input value A is smaller than the maximum bit-width supported by series 500 in the example illustrated in FIG. 5, series 500 may include unused Booth encoders. Booth encoder 510 may be the first unused Booth encoder. The bits of input A are left justified within series 500 such that the unused Booth encoders are on the right side of series 500. A left-justified arrangement allows for the unused Booth encoders to be located on the right side of series 500, such that the rounding correction value may be added to the first unused Booth encoder, which in this case is Booth encoder 510. Four other Booth encoders (BE03-BE00) may also not be utilized by the multiply operation. In other embodiments, there may be other numbers of Booth encoders in series 500 and other numbers of bits of input value A. For example, in another embodiment, A may be a single-precision floating point number with a mantissa bit length of 24. In this case, the first unused Booth encoder would be the Booth encoder corresponding to BE19.

A round increment input may be coupled as a first input of AND gate 502. An instruction dependency signal may be coupled to a second input of AND gate 502. The round increment signal may be asserted if rounding is required as a result of a prior operation. The instruction dependency signal may be asserted if a result of a prior operation is being utilized in the current operation. The output of AND gate 502 may be coupled to the input of the first unused Booth encoder in series 500, which in this case is Booth encoder 510. The output of AND gate 502 may be referred to as a rounding correction signal. In other embodiments, the output of AND gate 502 may be coupled to the input of a different Booth encoder.

In one embodiment, an XOR mode input signal may also be coupled to each of the Booth encoders in series 500. The XOR mode input signal may already exist in the architecture for XOR-capable multipliers. The methods and mechanisms described herein may be utilized with a multiply execution unit that is able to generate the integer product and the XOR product of a multiplicand and multiplier. Alternatively, multipliers without an XOR mode may be utilized with the illustrated methods and mechanisms.

Referring now to FIG. 6, a Booth encoder truth table in accordance with one embodiment is shown. Booth encoder truth table 600 may represent the operation of a Booth encoder in accordance with one embodiment. Table 600 may be a variation from the traditional Booth encoder truth table due to the inclusion of the XOR mode input and the rounding correction input. The columns Bit 2, Bit 1, and Bit 0 represent the values of the bits coupled to the input of the Booth encoder from one of the input values being multiplied. In the example of FIG. 5, "A" is the input value coupled to the Booth encoders.

The XOR Mode column represents the value of the XOR mode signal coupled to the input of the Booth encoder. The rounding correction column represents the value of the rounding correction signal coupled to the input of the first unused Booth encoder. As shown in FIG. 5, the rounding correction signal may be coupled to a single Booth encoder (Booth encoder 510).

In a few rows of table 600, all of the outputs (+3, −2, −1, +1, +2) are '0'. In one embodiment, when all of the outputs are '0', and these outputs are coupled to the select inputs of a Booth multiplexer, the output of the Booth multiplexer may be '0'. The P and H bits (not shown) may also be output by Booth encoders 506-514 to eliminate the use of sign extension bits for the signed partial products.

Figure 7:
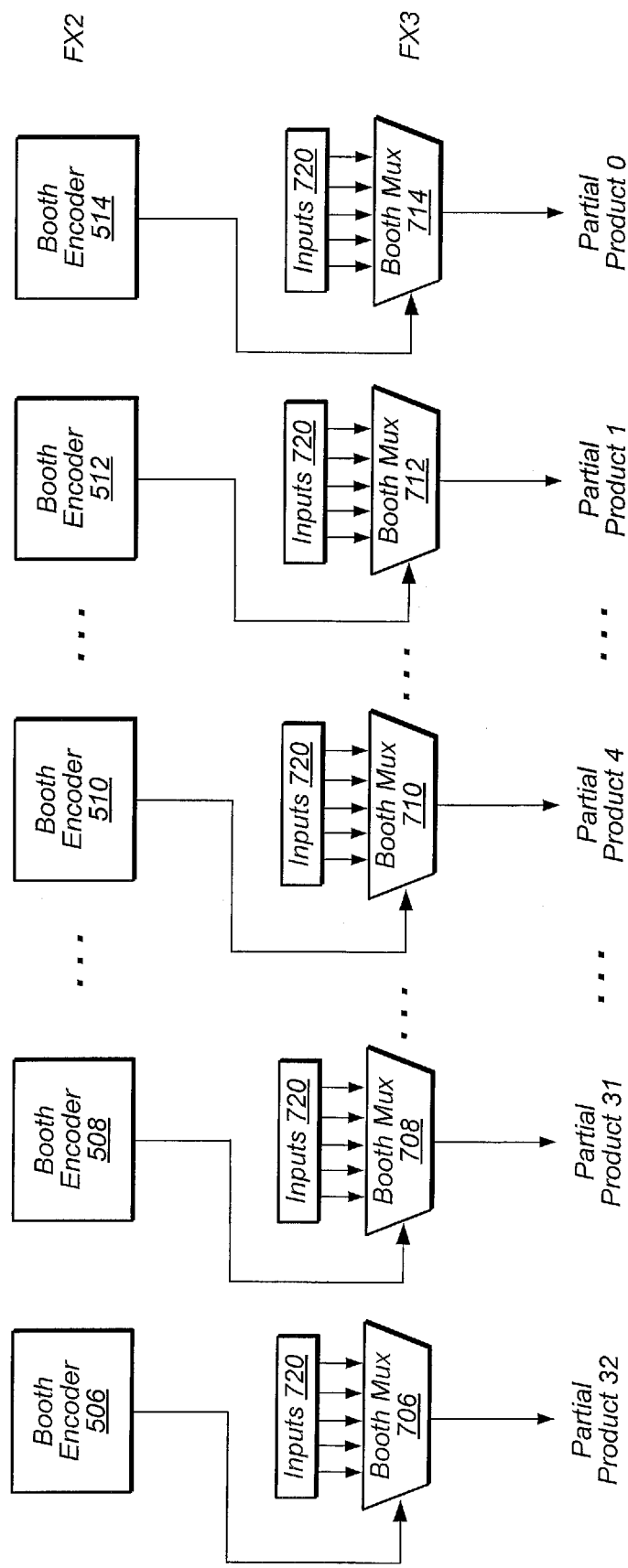
FIG. 7 illustrates a block diagram of one embodiment of the connections between Booth encoders and multiplexers.

Referring now to FIG. 7, the connections between Booth encoders and Booth multiplexers in accordance with one embodiment is shown. Booth encoders 506-514 represent the same Booth encoders as were depicted in FIG. 5. The outputs from Booth encoder 506 (corresponding to the most significant bits of input value A) are coupled to the select inputs of Booth multiplexer 706, the outputs from Booth encoder 508 are coupled to the select inputs of Booth multiplexer 708, and so on. In the embodiment depicted in FIG. 7, there are 33 Booth encoders and 33 Booth multiplexers, which may implement a 64-bit by 64-bit multiplier. In other embodiments, other quantities of Booth encoders and multiplexers may be utilized. Each Booth multiplexer may receive the same data inputs. The select inputs may determine which input of inputs 720 is passed through to the output of the Booth multiplexer. Each Booth multiplexer receives the same five inputs, and four of the inputs are based on the bit values of the C input value. These four inputs are the following: C, −C, 2*C, and −2*C. The fifth input connected to each Booth multiplexer is a rounding correction value. In another embodiment, the rounding correction value may only be coupled to the first unused Booth multiplexer of the series of Booth multiplexers.

The output of Booth multiplexer 706 may be partial product 32, the output of Booth multiplexer 708 may be partial product 31, and so on. In one embodiment, one or more Booth multiplexers may be unused by a multiply operation, and the most significant (or left-most) unused multiplexer may be Booth multiplexer 710. Booth multiplexer 710 may also be referred to as the first unused Booth multiplexer.

The output of Booth multiplexer 710 may be partial product 4, and partial product 4 may be the rounding correction value if rounding is required on one of the input values. In one embodiment, the input values being multiplied may have a bit-width of 53 bits (corresponding to double-precision floating point numbers), and the input bits may be arranged in a left justified manner, such that the most significant bits of the input values are aligned with the left-most Booth encoders and Booth multiplexers in each series. In another embodiment, the input values may have other bit-widths, and a partial product other than partial product 4 may include the rounding correction term. Partial products 32-0 are coupled to the inputs of a CSA tree (not shown). The CSA tree may include one or more levels of CSA's and CPA's, and the CSA tree may generate a sum of the plurality of partial products.

Figure 8:
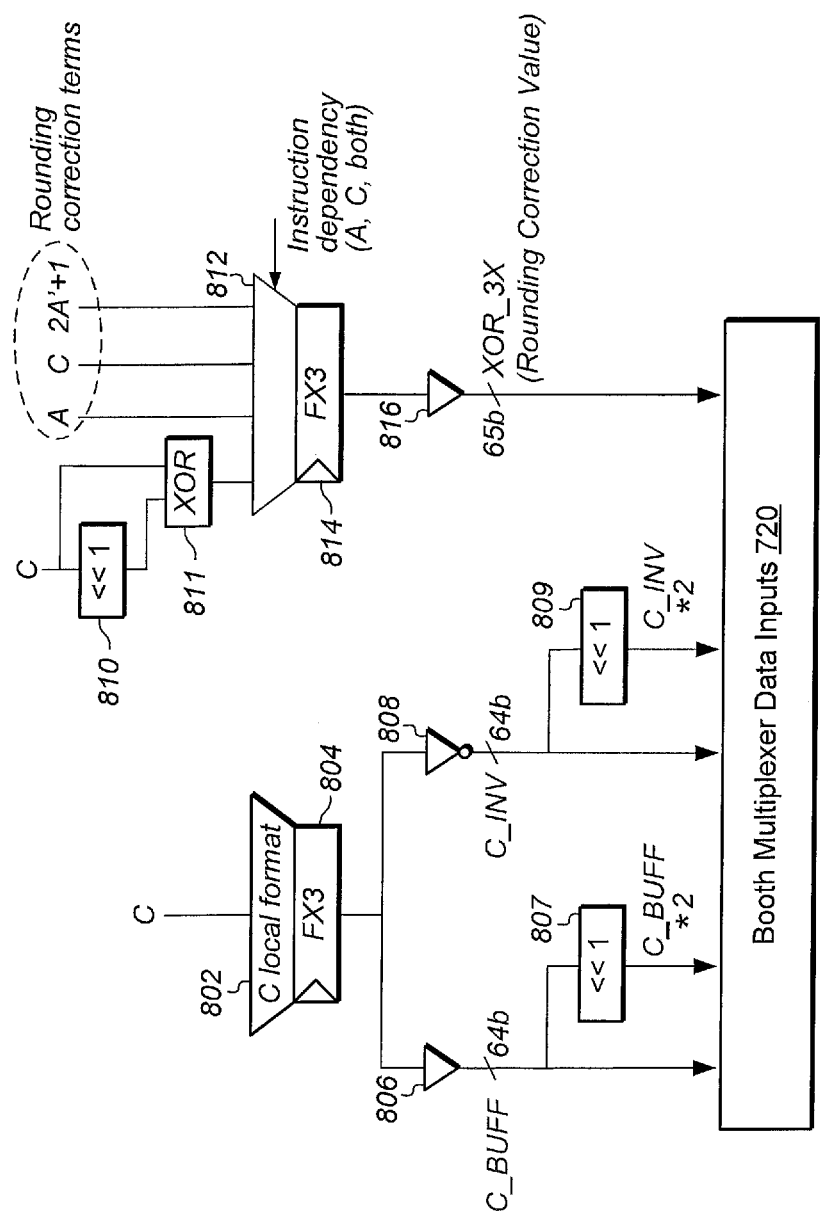
FIG. 8 illustrates the data inputs received by a series of multiplexers in accordance with one embodiment.

Referring now to FIG. 8, the data inputs received by a series of Booth multiplexers in accordance with one embodiment are shown. For the example illustrated in FIG. 8, the operation being performed by the multiplier is A*C. The A input value may be coupled to a series of Booth encoders, and the C input value may be coupled to the series of Booth multiplexers.

The C input value may be coupled to C operand multiplexer 802. The output of multiplexer 802 may be registered in register 804 during stage 3 of the multiply-add pipeline. The output of register 804 may be coupled to buffer 806. The output of buffer 806 may be referred to as "C_BUFF", and the bit width of the C_BUFF bus may be 64 bits in one embodiment. The output of register 804 may also be coupled to inverter 808. The output of inverter 808 may be referred to as "C_INV".

C_BUFF may be coupled to the input of each Booth multiplexer, and may be referred to as the "+1" term. C_BUFF may also be coupled to shifter 807, and shifter 807 may shift C_BUFF one bit to the left. Shifter 807 may not be an actual physical component, but may represent the shifting of the alignment of C_BUFF one bit to the left. A '0' bit value may be introduced into the vacated LSB bit of C_BUFF during the shifting process. The operation of shifting C_BUFF one bit to the left is equivalent to doubling C_BUFF. The output of shifter 807 may be coupled to each Booth multiplexer, and the output of shifter 807 may be referred to as the "+2" term. C_INV may be coupled to the input of each Booth multiplexer, and may be referred to as the "−1" term. C_INV may also be coupled to shifter 809, and shifter 809 may shift C_INV one bit to the left. The output of shifter 809 may be coupled to each Booth multiplexer, and the output of shifter 809 may be referred to as the "−2" term.

The rounding correction values may be coupled to the inputs of multiplexer 812. Multiplexer 812 may be a multiplexer separate from the series of Booth multiplexers. An instruction dependency signal may provide the select signal for multiplexer 812, and the instruction dependency signal may select from the three rounding correction values. The instruction dependency signal may be set based on the input operand (A, C, or both) to which the unrounded result of the prior operation is coupled. Multiplexer 812 may receive the three rounding correction values as inputs, and multiplexer 812 may select from the three rounding correction values (A, C, and (2*A'+1)). The fourth input, coupled to multiplexer 812 through XOR gate 811, may be utilized in a multiplier with an XOR mode. The C input value may be coupled to the first input of XOR gate 811 and to shifter 810, and the output of shifter 810 may be coupled to the second input of XOR gate 811. In one embodiment, the output of multiplexer 812 may be registered (in register 814) and buffered (in buffer 816) and then coupled to each multiplexer in the series of multiplexers. In another embodiment, the output of multiplexer 812 may be coupled to the first unused multiplexer in the series of multiplexers.

The output of buffer 816 may be referred to as the "XOR_3X" term. The XOR_3X term may also be referred to as the rounding correction value. The XOR_3X term may be 65 bits wide, and the extra bit may be needed if the rounding correction value is larger than the original 64 bit value, such as when the rounding correction value is (2*A'+1).

The five inputs (Booth multiplexer data inputs 720) shown in FIG. 8 may be coupled to each Booth multiplexer in the series of Booth multiplexers. Booth multiplexer data inputs 720 are also representative of inputs 720 (of FIG. 7). The four input terms (−2, −1, +1, +2) are the terms commonly applied to Booth multiplexers in a multiplier implementing a Booth algorithm. The fifth term is the "XOR_3X" term or rounding correction value. Some multipliers may perform an XOR multiply, and these multipliers may include a bus for use in XOR mode. In these embodiments, the XOR mode bus may be utilized for the rounding correction value. In other embodiments, the multiplier architecture may not include a bus for use in XOR mode. In those cases, a bus may be added to the first (or left-most) unused Booth multiplexer in the series of Booth multiplexers.

Figure 9:
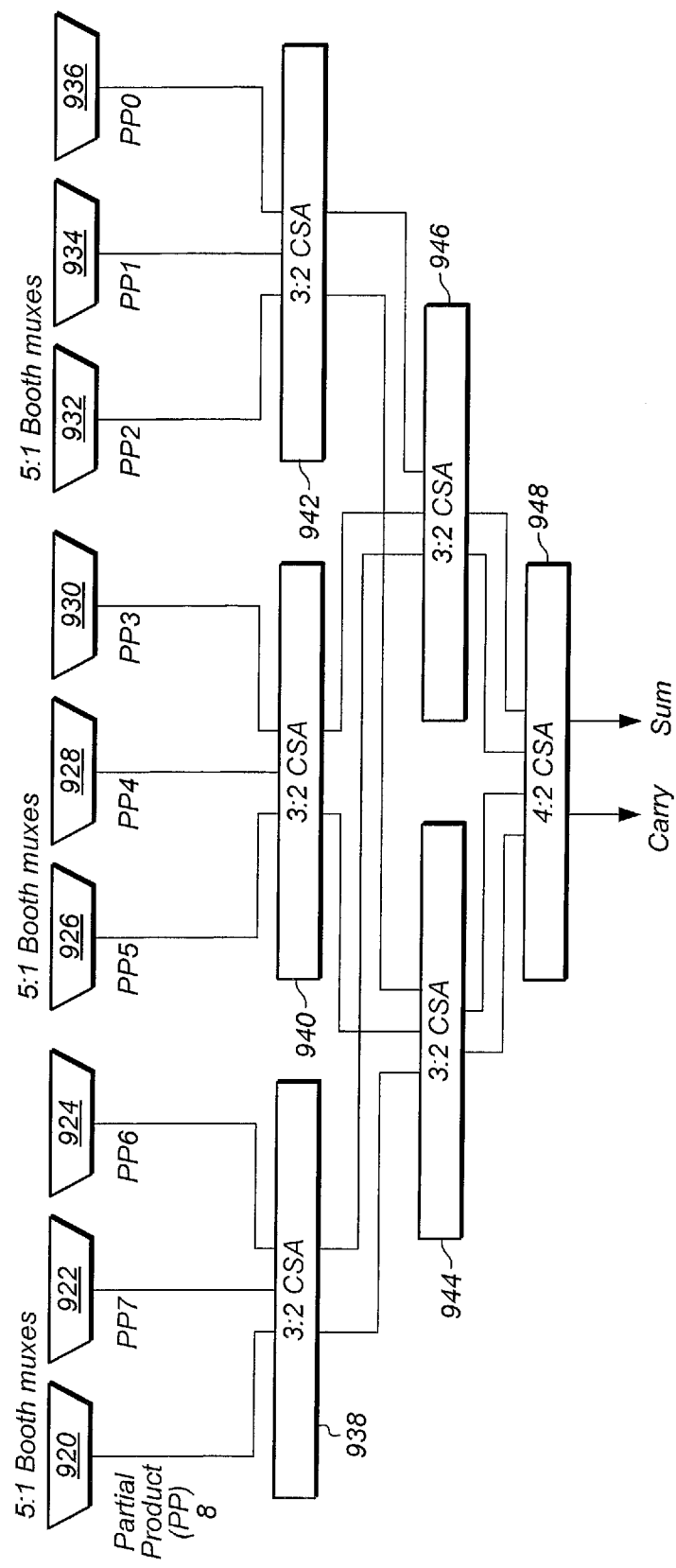
FIG. 9 illustrates a block diagram of one embodiment of a series of multiplexers coupled to a CSA tree.

Turning now to FIG. 9, one embodiment of a series of Booth multiplexers coupled to a CSA tree is shown. The nine Booth multiplexers (920-936) may be part of a series of 5:1 multiplexers, and the outputs (partial products 8-0) of Booth multiplexers 920-936 may be coupled to a CSA tree. In various embodiments, Booth multiplexers 920-936 may be other sizes of multiplexers (e.g., 4:1, 6:1). The CSA tree shown in FIG. 9 is a 9:2 CSA tree consisting of five 3:2 CSA's (938-946) and one 4:2 CSA (948) and three levels. Multiple 9:2 CSA trees may be organized into a larger CSA tree, as is shown in FIG. 3. The output of CSA 948 includes a carry output and a sum output. The carry and sum outputs of CSA 948 may be coupled to the inputs of a separate CSA or CPA.

In one embodiment, Booth multiplexers 920-936 and CSA's 938-948 may be part of a multiplier supporting 64-bit by 64-bit multiplies and the input values may be represented as double-precision floating point numbers. Booth multiplexers 920-936 may be the right-most multiplexers in a series of 33 multiplexers. The multiplier may be organized so that the input values are situated in a left-justified alignment within the multiplier. In such an embodiment, Booth multiplexer 928 may be the first unused multiplexer in the series of multiplexers, and partial product 4 may contain the rounding correction value. The rounding correction value may be aligned within Booth multiplexer 928 so that it overlays with the LSB of partial product 5 in 3:2 CSA 940. To align with the LSB of partial product 5, only 51 of the rounding correction value's 54 bits may fit within Booth multiplexer 928. The remaining three bits, which correspond to the three MSB's of the rounding correction value, may be connected to the unused sum outputs of CSA 942 so as to align with partial product 5 when combined in CSA 946. The rounding correction value may have a bit-width of 54 bits to accommodate a value of (2*A'+1).

Figure 10:
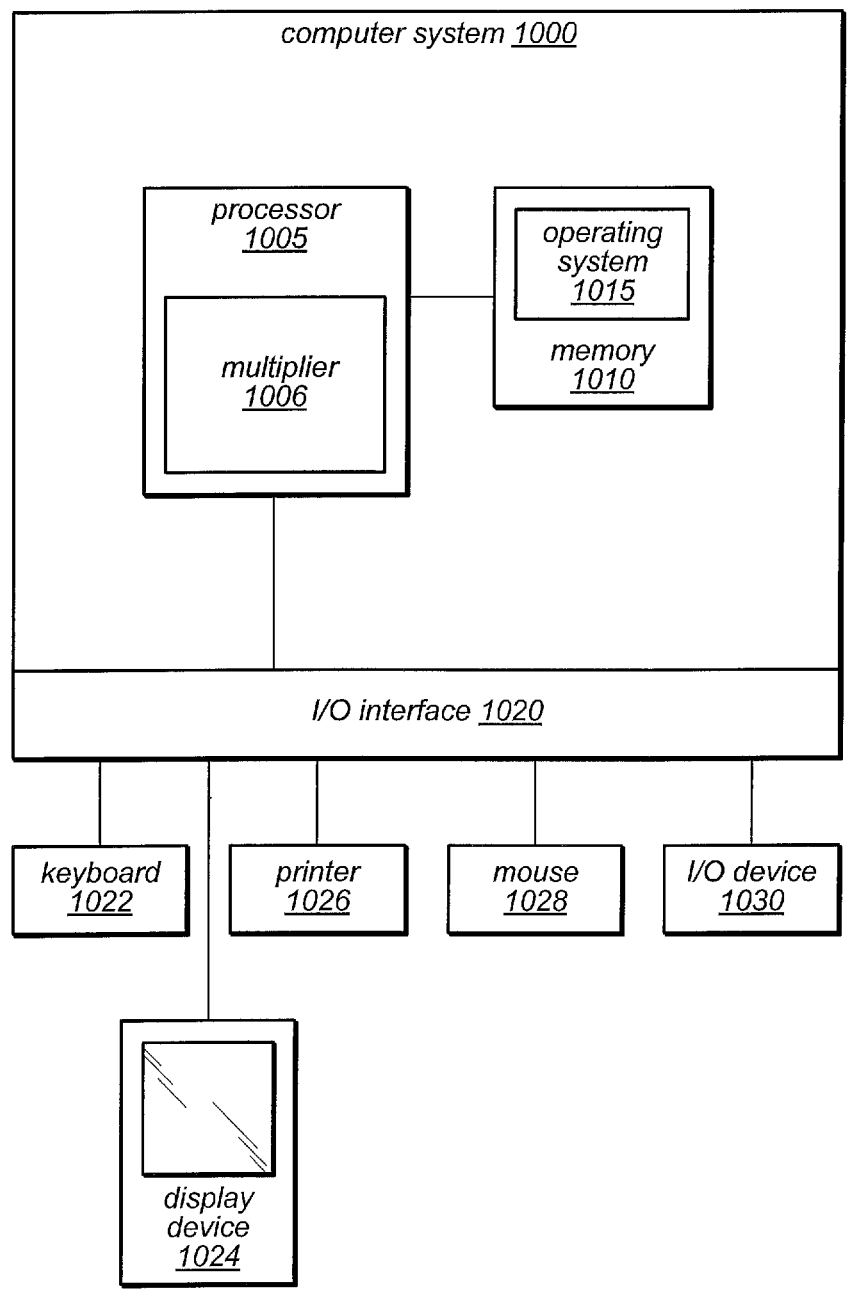
FIG. 10 illustrates one embodiment of a computer system including a processor with a multiplier.

Referring now to FIG. 10, one embodiment of a computer system including a processor with a multiplier is shown. The processor may be any of various processing units, as desired. For example, the processor may be a central processing unit (CPU) of various types, including an x86 processor, e.g., a Pentium class, a PowerPC processor, a CPU from the SPARC family of RISC processors, as well as others. Other processor types such as microprocessors are envisioned.

As shown, computer system 1000 may also include a memory medium 1010, typically comprising RAM and referred to as main memory, which may be coupled to a host bus by means of a memory controller. The main memory 1010 may store an operating system 1015 as well as application programs, etc., as well as other software for operation of the computer system. One or more of the software programs may cause the processor to execute multiply-add instructions using multiplier 1006, as previously described. Computer system 1000 will typically have various other devices/components, such as other buses, memory, peripheral devices, a display, etc. For example, as shown, the computer system 1000 may include an I/O interface 1020 which may be coupled to a keyboard 1022, display device 1024, printer 1026, mouse 1028, and/or other I/O device 1030. Thus, various embodiments of a multiplier and operation thereof may be performed by a processor inside a computer system.

It is noted that the above-described embodiments may comprise software. In such an embodiment, program instructions and/or a database (both of which may be referred to as "instructions") that represent the described methods and/or apparatus may be stored on a computer readable storage medium. Generally speaking, a computer readable storage medium may include any storage media accessible by a processor during use to provide instructions and/or data to the processor. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A processing unit configured to perform multiply operations, wherein the processing unit comprises:
   a plurality of encoders coupled to receive input corresponding to a source operand, wherein one or more of the plurality of encoders do not receive a source operand input for a given operation, wherein a first encoder of the one or more encoders is configured to receive a rounding correction signal as an input;
   a multiplexer configured to:
      receive a select signal conveyed from the first encoder; and
      receive one or more rounding correction values as data inputs;
   wherein in response to detecting the rounding correction signal indicates the source operand represents an unrounded result of the prior operation which requires rounding, the first encoder is configured to select for conveyance from the first multiplexer a rounding correction value.

2. The processing unit of claim 1, wherein the plurality of encoders are Booth encoders.

3. The processing unit of claim 1, wherein the first encoder is a most significant unused encoder of the one or more of the plurality of encoders that do not receive a source operand input for the given operation.

4. The processing unit as recited in claim 1, further comprising a second multiplexer, wherein the second multiplexer is configured to:
   receive as inputs two or more rounding correction values; and
   output a selected rounding correction value to the first multiplexer.

5. The processing unit as recited in claim 1, further comprising a carry save adder (CSA) tree, wherein the CSA tree comprises one or more levels of CSA's and carry propagate adders, and wherein the CSA tree is configured to:
   receive as inputs the rounding correction value and a plurality of partial products; and
   generate a sum of the rounding correction value and the plurality of partial products.

6. The processing unit of claim 1, wherein the source operand has N bits, and wherein the plurality of encoders and CSA tree support multiply operations on input values up to M bits, wherein M is greater than N.

7. The processing unit of claim 6, wherein N is 53 and M is 64.

8. A system comprising:
   a memory; and
   a processor coupled to the memory, wherein the processor comprises:
      a plurality of encoders coupled to receive input corresponding to a source operand, wherein one or more of the plurality of encoders do not receive a source operand input for a given operation, wherein a first encoder of the one or more encoders is configured to receive a rounding correction signal as an input;
      a multiplexer configured to:
         receive a select signal conveyed from the first encoder; and
         receive one or more rounding correction values as data inputs;

wherein in response to detecting the rounding correction signal indicates the source operand represents an unrounded result of the prior operation which requires rounding, the first encoder is configured to select for conveyance from the first multiplexer a rounding correction value.

9. The system as recited in claim 8, wherein the plurality of encoders are Booth encoders.

10. The system as recited in claim 8, wherein the first encoder is a most significant unused encoder of the one or more of the plurality of encoders that do not receive a source operand input for the given operation.

11. The system as recited in claim 8, further comprising a second multiplexer, wherein the second multiplexer is configured to:
   receive as inputs two or more rounding correction values; and
   output a selected rounding correction value to the first multiplexer.

12. The system as recited in claim 8, further comprising a carry save adder (CSA) tree, wherein the CSA tree comprises one or more levels of CSA's and carry propagate adders, and wherein the CSA tree is configured to:
   receive as inputs the rounding correction value and a plurality of partial products; and
   generate a sum of the rounding correction value and the plurality of partial products.

13. The system as recited in claim 8, wherein the source operand has N bits, and wherein the plurality of encoders and CSA tree support multiply operations on input values up to M bits, wherein M is greater than N.

14. The system as recited in claim 13, wherein N is 53 and M is 64.

15. A method for implementing a multiply operation, the method comprising:
   coupling a source operand as input to a plurality of encoders, wherein one or more of the plurality of encoders do not receive a source operand input for a given operation;
   receiving at a first encoder of the one or more encoders a rounding correction signal as an input;
   receiving at a multiplexer a select signal conveyed from the first encoder, and one or more rounding correction values as data inputs;
   the first encoder selecting for conveyance from the first multiplexer a rounding correction value, in response to detecting the rounding correction signal indicates the source operand represents an unrounded result of the prior operation which requires rounding.

16. The method as recited in claim 15, wherein the plurality of encoders are Booth encoders.

17. The method as recited in claim 15, wherein the first encoder is a most significant unused encoder of the one or more of the plurality of encoders that do not receive a source operand input for the given operation.

18. The method as recited in claim 15, further comprising:
   receiving two or more rounding correction values as inputs at a second multiplexer; and
   outputting a selected rounding correction value from the second multiplexer.

19. The method as recited in claim 15, further comprising:
   receiving the rounding correction value and a plurality of partial products as inputs to a carry save adder (CSA) tree, wherein the CSA tree comprises one or more levels of CSA's and carry propagate adders; and
   generating a sum of the rounding correction value and the plurality of partial products.

20. The method as recited in claim 15, wherein the source operand has N bits, and wherein the plurality of encoders and CSA tree support multiply operations on input values up to M bits, wherein M is greater than N.

* * * * *

UNITED STATES PATENT AND TRADEMARK OFFICE
CERTIFICATE OF CORRECTION

PATENT NO. : 8,671,129 B2  
APPLICATION NO. : 13/043101  
DATED : March 11, 2014  
INVENTOR(S) : Brooks et al.

Page 1 of 1

It is certified that error appears in the above-identified patent and that said Letters Patent is hereby corrected as shown below:

On Title page, column 2, under Other Publications, line 6, delete "atAustin" and insert -- at Austin --, therefor.

Signed and Sealed this
Twelfth Day of August, 2014

Michelle K. Lee
*Deputy Director of the United States Patent and Trademark Office*